(12) United States Patent
Garoff et al.

(10) Patent No.: US 6,818,584 B2
(45) Date of Patent: Nov. 16, 2004

(54) PROCESS FOR PREPARING A ZIEGLER-NATTA CATALYST

(75) Inventors: Thomas Garoff, Helsinki (FI); Solveig Johansson, Stenungsund (SE); Paivi Waldvogel, Porvoo (FI)

(73) Assignee: Borealis Technology OY, Porvoo (FI)

( * ) Notice: Subject to any disclaimer, the term of this patent is extended or adjusted under 35 U.S.C. 154(b) by 4 days.

(21) Appl. No.: 10/182,371

(22) PCT Filed: Jan. 29, 2001

(86) PCT No.: PCT/GB01/00368

§ 371 (c)(1),
(2), (4) Date: Jul. 29, 2002

(87) PCT Pub. No.: WO01/55230

PCT Pub. Date: Aug. 2, 2001

(65) Prior Publication Data

US 2003/0008769 A1 Jan. 9, 2003

(30) Foreign Application Priority Data

Jan. 27, 2000 (GB) .............................. 0001914

(51) Int. Cl.[7] .......................... B01J 31/00; B01J 37/00; C08F 4/02; C08F 4/60
(52) U.S. Cl. ...................... 502/103; 502/110; 502/115; 502/128; 502/132; 526/124.3
(58) Field of Search ................................ 502/103, 110, 502/115, 128, 132; 526/124.3

(56) References Cited

U.S. PATENT DOCUMENTS

| 4,544,647 A | 10/1985 | Fuentes, Jr. et al. | |
| 4,866,144 A | * 9/1989 | Best et al. | 526/129 |
| 4,900,706 A | * 2/1990 | Sasaki et al. | 502/116 |
| 4,981,826 A | * 1/1991 | Speca | 502/116 |
| 5,192,731 A | * 3/1993 | Kioka et al. | 502/110 |
| 5,330,951 A | * 7/1994 | Mink et al. | 502/115 |
| 5,589,555 A | 12/1996 | Zboril et al. | |
| 5,817,591 A | 10/1998 | Shamshoum et al. | |
| 6,620,758 B1 | * 9/2003 | Lindroos et al. | 502/110 |

FOREIGN PATENT DOCUMENTS

| EP | 0 022 376 | 1/1981 |
| EP | 0 174 103 | 3/1986 |
| EP | 0 408 750 | 1/1991 |
| EP | 0 601 525 | 6/1994 |
| EP | 0 688 794 | 12/1995 |
| WO | WO 91/09881 | 7/1991 |

* cited by examiner

*Primary Examiner*—Mark L. Bell
*Assistant Examiner*—Jennine M Brown
(74) *Attorney, Agent, or Firm*—Nixon & Vanderhye P.C.

(57) ABSTRACT

Especially homogeneous supported Ziegler-Natta catalysts may be prepared in a simple one reaction vessel process from a magnesium hydrocarbyloxy starting material which is soluble in a hydrocarbon solvent. The process comprises: (I) reacting a magnesium hydrocarbyloxy compound with a chlorine-containing compound in a non-polar hydrocarbon solvent in which said magnesium hydrocarbyloxy compound is soluble whereby to produce a solution (A); and then either: (II) contacting the solution (A) with a chlorine containing tetravalent titanium compound to produce a solution (B); (III) impregnating solution (B) into a porous particulate support; or (II) impregnating solution (A) into a porous particulate support; and (III) contacting the solid support with a chlorine containing tetravalent titanium compound; or (II) impregnating solution (A) into a porous particulate support pretreated with a chlorine containing tetravalent titanium compound.

11 Claims, 1 Drawing Sheet

PROCESS FOR PREPARING A ZIEGLER-NATTA CATALYST

Figure 1:
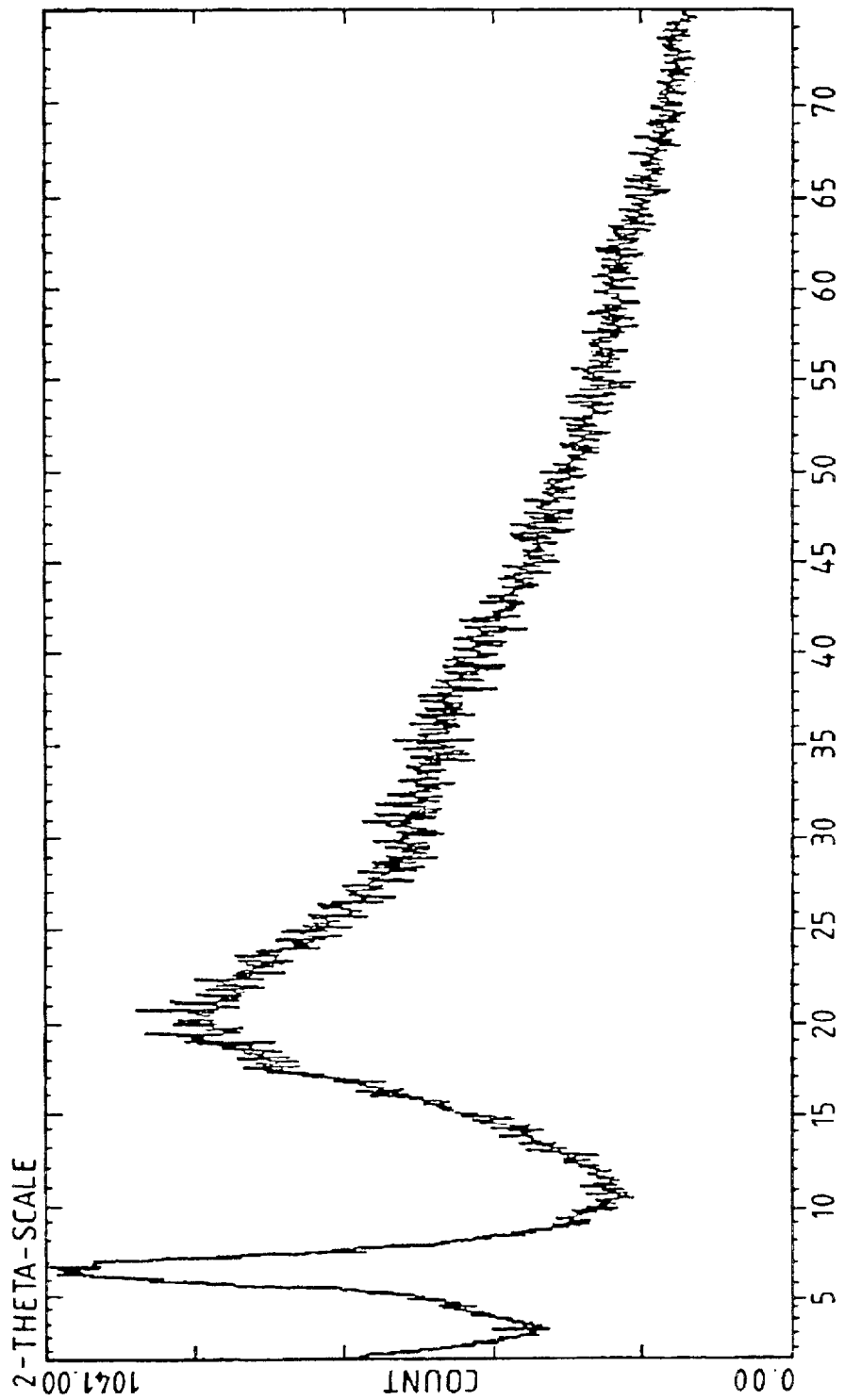

This invention relates to a new process for preparing a Ziegler-Natta catalyst and in particular to a simple solution phase process which can be carried out in one reaction vessel.

Ziegler-Natta type polyolefin catalysts have been known since the early 1950's and general methods of their making and subsequent use are well known in the field of polymers. The use of Ziegler-Natta catalysts in multiple step polymerisation of olefins however often results in the production of a polymer containing undesirable inhomogeneities, e.g. gels and white dots.

Ziegler-Natta catalysts are generally formed from two components: a compound of a transition metal belonging to groups 4 to 6 of the Periodic Table, often called the procatalyst; and a compound of a metal belonging to groups 1 to 3 of the Periodic Table. Such catalyst compositions have been further developed by depositing the procatalyst on a particulate support and by adding various additives such as electron donating groups.

There has been much research into different methods of preparing Ziegler-Natta catalysts and how differing reaction conditions may result in polymer products with differing properties. There remains however, a continuing search for new methods of preparing Ziegler-Natta catalysts with improved properties.

One conventional route of preparing Ziegler-Natta catalysts is to use a particulate support throughout the synthesis. For example, in EP-A-688794 a process is disclosed in which a support is contacted with an alkyl metal chloride, the resulting product is contacted with a magnesium compound and the product of this second stage is contacted with a titanium chloride. The reactions in this synthesis obviously take place on the surface of or in the neighbourhood of the support. In such a synthesis, the individual reaction steps may proceed differently depending on the nature of the interaction with the support. This may lead to non-uniform active sites and in turn to inhomogeneous polymer material. Recently however, a number of solution phase syntheses of Ziegler-Natta catalysts have been proposed.

In U.S. Pat. No. 5,817,591, a process for producing Ziegler-Natta polymerisation catalysts from magnesium alkoxy chloride is described. The magnesium alkoxy chloride is dissolved in a hydrocarbon solvent with the addition of an alcohol before the solution is contacted with titanium tetrachloride to give a precipitate. This precipitate is converted into the catalyst upon the addition of further titanium tetrachloride and of butyl phthalate.

In EP-A-22376 a catalyst is prepared by suspending magnesium dichloride in hexane and adding ethanol, followed by diethyl aluminium chloride followed by titanium tetrachloride.

Both these methods involve a magnesium compound which is insoluble in hydrocarbon solvents, a further reagent being required to ensure the magnesium compound is solubilised. The inventors of the present invention have surprisingly found that preparing Ziegler-Natta catalysts from a magnesium compound which is essentially soluble in an inert hydrocarbon solvent results in high catalyst activity, the production of homogeneous olefin polymers with low levels of gels and other impurities such as white dots, and the reduction of residual levels of reagents from catalyst production.

In U.S. Pat. No. 5,589,555 a Ziegler-Natta catalyst in solution is prepared by mixing dibutylmagnesium, triethylaluminium, tertiarybutylchloride and titanium tetrachloride in, for example, cyclohexane in one reaction vessel. The resulting catalyst composition is then used directly as a Ziegler-Natta catalyst. While this kind of strongly reduced catalyst is suitable for a solution polymerization process operating at a high temperature and a short residence time, it is less suitable for a suspension polymerization process operating at a relatively low temperature and having a longer residence time. For example the polymerization activity of this type of catalyst tends to decay rapidly with time and the activity at lower polymerization temperatures is usually low.

It has now been surprisingly found that especially homogeneous supported Ziegler-Natta catalysts may be prepared in a simple one reaction vessel process from a magnesium hydrocarbyloxy starting material which is soluble in a hydrocarbon solvent. By preparing the Ziegler-Natta catalyst in the solution phase before impregnating the final solution into a support, a much more homogeneous catalyst product is obtained. Clearly, the impregnating solution allows even and homogeneous impregnation into the support thus enabling production of a catalyst giving a more homogeneous polymer. Moreover, the entire process may take place in a single reaction vessel giving both process and economic advantages over prior art catalysts.

Thus, viewed from one aspect the invention provides a process for the preparation of a Ziegler-Natta catalyst comprising the steps of:

(I) reacting a magnesium hydrocarbyloxy compound, with a chlorine-containing compound (e.g. HCl, or more preferably a chlorine-containing metal alkyl compound, most preferably a chlorine-containing aluminium alkyl compound) in a non-polar hydrocarbon solvent in which said magnesium hydrocarbyloxy compound is soluble whereby to produce a solution (A);

(II) contacting the solution (A) with a chlorine containing tetravalent titanium compound to produce a solution (B); and optionally (III) impregnating solution (B) into a porous particulate support.

Viewed from another aspect the invention provides a Ziegler-Natta catalyst obtained by the process as hereinbefore described.

The magnesium hydrocarbyloxy compound used in the preparation of solution (A) is conveniently a magnesium hydrocarbyl hydrocarbyloxy compound, a magnesium dihydrocarbyloxy compound, a magnesium hydrocarbyloxy chloride compound or a magnesium hydrocarbyl hydrocarbyloxy chloride compound, i.e. a compound of formula 1

$$MgR_x(OR)_yCl_z \qquad (1)$$

where x and z are zero or positive numbers which may or may not be integers, each independently having values of less than 2, y is a positive number having a value of up to 2 and the sum of x, y and z is 2; and each R independently represents a $C_{1-20}$ hydrocarbyl group preferably a $C_{2-15}$ group, especially a $C_{3-10}$ group and more preferably a $C_{4-8}$ group, e.g. an alkyl, aryl, aralkyl or alkaryl group, for example an ethyl, propyl, butyl, pentyl, hexyl, heptyl, octyl, 2-methyl-hexyl or 2-ethyl-hexyl group, especially a linear alkyl group. The magnesium hydrocarbyloxy compound may moreover be a magnesium hydrocarbyl alcohol adduct.

The magnesium hydrocarbyloxy compound is used in solution and hence, as will be understood from the above, may be a mixed compound in which the ratio of Mg to R, to OR or to Cl is a non-integer. In general, for the magnesium hydrocarbyloxy compound to be soluble in the hydrocarbon solvent, where y is large then z or/and x will correspondingly be small. In other words the OR groups essentially serve to solubilize the compounds. Solubilisation may likewise be enhanced by increased disorder, i.e. by the use of non-identical R groups or by the use of R groups of similar structure to the hydrocarbon solvent, for example by the use of aromatic R groups if the solvent is aromatic.

Magnesium hydrocarbyloxy compounds usable in the process of the invention may be produced for example by reaction of magnesium dihydrocarbyl (e.g. dialkyl) compounds with alcohols (i.e. hydrocarbyl alcohols), optionally followed by reaction with a chlorinating agent, for example a hydrocarbyl aluminium chloride (such as for example ethyl aluminium dichloride). The desired values of x, y and z may be achieved by selecting the molar ratios of magnesium dihydrocarbyl compound to alcohol and to chlorinating agent. Likewise magnesium hydrocarbyloxy chlorides in which x is zero and z is non-zero may be produced by reacting a magnesium dihydrocarbyloxy compound with a chlorinating agent.

Suitable magnesium dialkyl starting compounds include dibutyl magnesium, butyl-octyl magnesium, and butyl-ethyl magnesium.

Suitable magnesium dialkoxy starting compound include magnesium di-(2-ethyl-1-hexanolate), magnesium di-(1-octanolate) and magnesium di-(2-methyl-1-pentanolate).

The alcohol used to transform the magnesium dihydrocarbyl starting compounds may be any alcohol capable of forming a magnesium hydrocarbyloxy compound which is soluble in the non-polar hydrocarbon solvent and this may be readily determined by the person skilled in the art. For example suitable alcohols include those of formula ROH where R is as hereinbefore defined. Preferred alcohols include octanol, hexanol and butanol, but especially 2-ethyl-1-hexanol and 2-methyl-1-pentanol. In general longer chain alcohols, such as $C_{4-15}$ alcohols, are preferred since these are known to form hydrocarbon-soluble adducts with magnesium.

Where an alcohol is used, it is preferred that the magnesium dihydrocarbyl compound/alcohol molar ratio is from 1:1 to 1:4, more preferably 1:1.5 to 1:3.5, especially 1:1.8 to 1:3.1.

The reaction of the magnesium dihydrocarbyl compound and the alcohol may take place at any temperature but preferably takes place at low temperature, e.g. 0–40° C., especially at room temperature.

Where the chlorine containing compound contains metal, the chlorine containing metal compound may be any metal compound which can chlorinate the magnesium compound. Preferably the metal compound is a chlorine-containing group 13 metal compound. More preferably, the compound is a chlorine containing compound of B or Al, for example $BCl_3$ or $AlCl_3$. Especially, preferably, the compound is a chlorine containing aluminium alkyl compound.

The chlorine-containing aluminium alkyl compound should comprise at least an alkyl component and a chlorine component although the ratio of these components may vary. Thus the chlorine-containing aluminium alkyl compound may be of formula (2)

$$AlR_{3-m}Cl_m \tag{2}$$

wherein R is as hereinbefore defined and 0<m<3. Preferred chlorine-containing aluminium alkyl compounds include dimethyl aluminium chloride, diethyl aluminium chloride, diisobutyl aluminium chloride, ethyl aluminium dichloride (EADC), and methyl aluminium dichloride. Alkyl aluminium dichlorides are preferred and ethyl aluminium dichloride is especially preferred.

Instead of the chlorine containing metal compound discussed above, another chlorinating agent may be used. This chlorinating agent may be any compound which can chlorinate the magnesium compound. Specific examples of such compounds are hydrogen chloride, chlorine gas, chlorinated hydrocarbons like tert-butylchloride or methylchloride, sulphur containing chlorine compounds such as $SOCl_2$, and chlorine containing compounds of phosphorus, such as $PCl_5$.

The non-polar hydrocarbon solvent employed in step (I) of the process of the invention is one in which the magnesium hydrocarbyloxy compound is soluble. Suitable solvents include $C_{5-20}$ hydrocarbons such as cyclohexane, hexane, heptane, octane, methylcyclohexane, especially $C_{6-12}$ linear, branched or cyclic hydrocarbons (for example toluene) or mixtures thereof. The hydrocarbon solvent should however be inert in that it does not react with any of the catalyst intermediates or products formed during the preparation of the Ziegler-Natta catalyst.

The magnesium hydrocarbyloxy compound and the chlorine-containing compound (preferably the chlorine containing aluminium alkyl) are preferably contacted in Step (I) by adding for example the chlorine-containing aluminium alkyl to a magnesium hydrocarbyloxy compound. The temperature of the solution is preferably adjusted to between 0 to 100° C., preferably 10 to 100° C., especially 20 to 70° C. before the addition of the chlorine-containing aluminium alkyl compound. It is preferred to contact the magnesium compound and the chlorine-containing compound so that the chlorine-containing compound is added into the magnesium hydrocarbyloxy compound.

Where a hydroxycarbyl aluminium chloride is used in Step (I), the reaction with the magnesium hydrocarbyloxy compound results in the formation of a magnesium chloride/aluminium compound which is soluble in the non-polar hydrocarbon and this compound also forms a further aspect of the invention. Thus viewed from another aspect the invention provides a compound of formula (3)

$$Cl_aMg(OR)_b[Cl_cAlR_d(OR)_e]_n \tag{3}$$

where a+b=2 and c+d+e=3 and n is 0.6 to 2; b may be zero or a positive number; a is a positive number; c is zero or a positive number; d and e are positive numbers; and each R independently is a hydrocarbyl group as defined earlier), as well as the reaction products thereof with a chlorine containing tetravalent titanium compound, especially titanium tetrachloride.

The magnesium hydrocarbyloxy compound and chlorine containing-aluminium-alkyl compound are preferably used in Step (I) in a Mg:Al molar ratio of 0.5:1 to 1.5:1, more preferably 0.8:1 to 1.2:1, especially about 1:1.

The amount of titanium compound added to the solution (A) is preferably such that the molar ratio of magnesium to titanium is between 5:1 and 1:1, particularly between 3:1 and 1.5:1. This solution (B) will generally be stable for at least one hour, but normally for days.

The titanium compound is preferably a chlorine-containing tetravalent titanium compound such as a trialkoxy titanium monochloride, dialkoxy titanium dichloride, alkoxy titanium trichloride or most preferably titanium tetrachloride. The alkoxy portion may contain 1 to 20, preferably 1 to 10, especially 2 to 8 carbon atoms.

The titanium compound may be added to solution (A) at a temperature from 0 to 90° C., preferably from 10 to 70° C., especially 20 to 60° C., e.g. ambient temperature and is normally administered in a hydrocarbon solvent, preferably the same solvent as used in Step (I).

The solution (B) itself forms a further aspect of the invention and thus viewed from another aspect the invention provides a solution obtainable by the reaction of a solution (A) with a chlorine-containing tetravalent titanium compound.

The solution (B) may be used directly as a polymerisation (e.g. olefin polymerisation) catalyst. However, it is preferably first impregnated into a porous particulate support. Suitable supports are well-known in the art and include e.g. inorganic or organic carrier materials, preferably solid materials. Conventional catalyst support materials may be used in this regard, e.g. porous inorganic or organic materials, for example inorganic oxides such as silica, alumina, silica-alumina, silica with titania, zirconia, etc, non-oxides such as magnesium halides, e.g. $MgCl_2$, aluminium phosphate, zeolites, etc, celluloses, starches, and polymers such as polystyrene, polymethacrylate, polystyrene-divinylbenzene and polyolefins such as polyethylene and polypropylene.

Carrier materials, especially inorganic materials, are preferably thermally and/or chemically pre-treated, for example so that the water content or the OH group concentration is kept as low as possible. Chemical pre-treatment can for example comprise reaction of the carrier with aluminium alkyl. Inorganic carriers are usually heated to 100° C. to 1000° C. for 1 to 100 hours before use. The surface area of such inorganic carriers, especially of silica ($SiO_2$) is generally between 10 and 1000 $m^2/g$, preferably between 100 and 800 $m^2/g$. The median weight average particle diameter is generally between 0.1 and 500 micrometers ($\mu m$), preferably between 10 and 200 $\mu m$.

The carrier may be treated as described in WO96/00245, WO95/11264, EP-A-619325 or, more preferably, WO95/12622.

Impregnation preferably is effected at 25 to 50° C. for 1 to 10 hrs, e.g. 5 hrs. The resulting supported catalyst may be dried by any suitable means, e.g. under a stream of nitrogen at 50 to 100° C. for 1 to 5 hrs followed by simple heating at the same temperature for a further 12 to 24 hrs.

Impregnation may be carried out so that all the support particles are suspended as a slurry in the solution (B). An alternative and preferred method to prepare the catalyst is to add the impregnation solution (B) to the support. Preferably the amount of the impregnation solution (B) is similar to the pore volume of the support material, or slightly higher during the whole impregnation. In this way a highly homogeneous solid catalyst is generated.

The catalyst may be dried using any method known in the art to remove the excess hydrocarbons. Thus, for example, the catalyst may be dried by subjecting it to a vacuum treatment, or by treating the catalyst in a stream of an inert gas, optionally at elevated temperatures. It is preferred to conduct the drying at a temperature below 100° C., to avoid chemical modifications in the catalyst.

The resulting supported catalyst may be employed in the polymerisation of olefins and this forms a further aspect of the invention. Hence, viewed from a further aspect the invention provides a process for the polymerisation of olefins, preferably a two stage process, comprising contacting at least one olefin with a catalyst prepared by a process as hereinbefore described. The catalyst of the present invention gives rise to high olefin polymerisation productivity, especially in a two stage polymerisation process.

The catalyst of the present invention also makes it possible to produce polymer material with good homogeneity. Thus, the products made of such polymer have a low gel level or a low level of phase separation.

The catalyst produced in the process of the invention may be employed in polymerization in a single stage or multi-stage (ie. at least two stage) polymerisation reaction. The reactors used may conveniently be any of the conventionally used polymerization reactors, e.g. reactors for solution polymerization, slurry tank or slurry loop polymerization or gas phase polymerization, etc. The polymer product of an early stage (e.g. the first stage) may be passed on to the subsequent stage (e.g. second stage) reactor on a continuous, intermittent or batchwise basis. In an intermittent process, a batch of the reaction mixture is discharged from one reactor and passed to the next reactor at a regular interval which is less than the overall average residence time for the first reactor, e.g. batches may be removed every minute even though the overall residence time is one hour. Each reactor will conveniently be provided with means for supplying monomer into the reactor and the overall multi-reactor structure will preferably be provided with means for recycling diluents, fluidizing gas or monomer into one or more of the individual reactors. The polymerisation process may be carried out in a single reactor or using a combination of two or more of the reactor types mentioned above, e.g. a combination of a loop and a gas-phase reactor such as that described in EP-A-517868. Preferably the process of the invention should use only particle forming reactors such as slurry and gas phase reactors or solution phase reactors. The total number of reactors used will depend on the catalyst system used and the molecular weight distribution desired for the polymer end product. Typically 2 to 5, preferably 2 or 3, most preferably 2 main reactors will be used.

For slurry reactors, the reaction temperature will generally be in the range 60 to 110° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C. or will be the monomer itself. In such reactors, polymerization may if desired be effected under supercritical conditions, especially in loop reactors.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer(s) (e.g. ethylene, propylene, 1-butene, 1-hexene or 1-octene).

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80–200° C.

Optionally, hydrogen may be employed in the polymerisation process to control the molecular weight of the polymer as is well-known in the art. Thus for example, to produce a low molecular weight polymer may involve use of a relatively high concentration of hydrogen in the polymerization mixture, whereas to produce a high molecular weight polymer may involve use of no hydrogen or a relatively low concentration of hydrogen.

The catalyst of the invention is suitable for use in the polymerization of olefins, in particular alpha-olefins and mixtures thereof, e.g. $C_{2-10}$ α-olefins such as ethylene, propene, but-1-ene, hex-1-ene, 4-methyl-pent-1-ene, oct-1-ene, etc. The catalyst is particularly effective for the preparation of polyethylene and polypropylene as well as copolymers of ethylene with one or more copolymerizable monomers, e.g. $C_{3-20}$ mono and dienes, styrene, and norbornene, or more preferably $C_{3-10}$ α-olefin monomers and copolymers of propene with one or more copolymerizable monomers, e.g. $C_{4-20}$ mono and dienes, or more preferably $C_{4-10}$ α-olefin monomers or ethylene.

The polymers produced using the catalyst of the invention are especially homogeneous having low levels of gels and other inhomogeneities.

It is possible to prepare the catalyst of the invention by first Impregnating the support with a solution (A) before contact with the titanium compound and this forms a further aspect of the invention. Thus, viewed from a yet further aspect the invention provides a process for the preparation of a Ziegler-Natta catalyst comprising the steps of:

(I) reacting a magnesium hydrocarbyloxy compound with a chlorine-containing compound in a non-polar hydrocarbon solvent in which said magnesium hydrocarbyloxy compound is soluble whereby to produce a solution (A);

(II) impregnating solution (A) into a porous particulate support; and (III) contacting the support with a chlorine-containing tetravalent titanium compound.

Likewise, but less preferably, a solution of the magnesium hydrocarbyloxy compound and chlorine-containing compound may be impregnated into a dry, titanium tetrachloride treated support. Thus viewed from a further aspect the invention provides a process for the preparation of a Ziegler-Natta catalyst comprising the steps of:

(I) contacting a porous particulate support with a chlorine-containing tetravalent titanium compound;

(II) forming a solution of magnesium hydrocarbyloxy compound with a chlorine-containing compound in a non-polar hydrocarbon solvent; and (III) impregnation said solution into said support.

The invention will now be further described with reference to the following non-limiting Examples and to the accompanying drawings in which:

FIG. 1 is an X-ray diffraction pattern of the magnesium/aluminium complex of Example 2.

Chemicals

The Mg-alkyl ($MgR_2$) used was BOMAG-A from Schering which was a 20% toluene solution of butyloctylmagnesium $(n-C_4H_9)_{1.5}(n-C_8H_{17})_{0.5}$ Mg with a magnesium content of 2.92% and a density of 0.8451 g/ml. This reagent was used as such with no preceding purification.

2-ethyl-1-hexanol (EHA) from Merck was used as an alcohol. It was liberated from traces of moisture by storing it over a molecular sieve.

Ethyl aluminium dichloride (EADC) was obtained from Witco as a 20% pentane solution.

Toluene (Merck) was liberated from traces of moisture by storing it over a molecular sieve.

Experimental

Determination of Ti, Mg, Al and Cl

Samples of the catalyst complexes were dissolved in a mixture of nitric and hydrofluoric acid and the metals were measured by flame atomic absorption with a nitrous oxide/acetylene flame. Chloride was determined, after dissolution in dilute sulphuric acid, by potentiometric titration with a standard silver nitrate solution.

X-Ray Diffraction Patterns

WAXS patterns were collected in reflection mode between 2° and 70° (2Θ) with a Siemens D500 instrument. The diffractometer was equipped with a Cu anode and a graphite monochromator in the reflected beam. The CuKα radiation wavelength was 1.541 Å. The effect used was 40 kV and 35 mA. The sample was loaded in a glovebox into a Mylar film covered sample holder. The Mylar film forms a half-cylindrical window, allowing X-rays to pass perpendicularly through.

Ethylene Test Polymerization was Carried out as Follows:

1.8 liters of purified n-pentane was introduced into a 3 liter autoclave reactor. The reactor was heated to 90° C. A 500 ml vessel was pressurized with hydrogen to a pressure of 500 kPa. The supported catalyst component and a predetermined amount of triethyl aluminum (TEA) cocatalyst to reach an Al/Ti molar ratio of 1:15 were introduced into the reactor. Polymerization was started by feeding ethylene through the vessel so that the partial pressure of ethylene in the reactor was about 1000 kPa. Ethylene was continuously introduced into the reactor to maintain a constant pressure and to replace the amount consumed in polymerization. The polymerization was allowed to proceed for 1 hour, after which the reaction was terminated by removing the monomer from the reactor. The polymer was then collected, dried and analyzed.

The polymer was weighed, the melt flow rates ($MFR_2$ and $MFR_{21}$) were determined at 190° C. with 2.16 and 21.6 kg loads according to ISO 1133 and bulk density was measured by determining the weight of the polymer powder occupying a specified volume.

EXAMPLE 1

Preparation of a Magnesium Alkoxy Compound 20.0 ml (20.291 mmol) of BOMAG-A was introduced into a 150 ml glass reactor under inert conditions at room temperature. 6.41 ml (40.582 mmol) of 2-ethyl-hexanol was added by syringe into the reactor while stirring. The addition was done in one minute, also at room temperature. The temperature was increased to 60° C., and the reactants were allowed to react with each other for 30 min. A clear colourless solution with high viscosity resulted.

EXAMPLE 2

Preparation of a Soluble $MgCl_2$—Al (—O—$2C_2H_5$—$C_6H_{13}$)$_3$ Compound 20.0 ml (20.29 mmol) of BOMAG-A was introduced into a 150 ml glass reactor in inert conditions at room temperature. 9.61 ml (60.87 mmol) of 2-ethyl-hexanol was added by syringe into the reactor while stirring. The addition was done in one minute also at room temperature. The temperature was increased to 60° C., and the reactants were allowed to react with each other for 30 min. A clear colourless solution with high viscosity resulted. The reaction taking place was as follows:

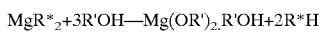
MgR*$_2$+3R'OH→Mg(OR')$_2$.R'OH+2R*H (where R* is $(n-C_4H_9)_{1.5}(n-C_8H_{17})_{0.5}$ and R' is 2-ethylhexyl)

18.6 ml (20.29 mmol) of ethyl aluminium dichloride and a (EADC) was added at 60° C. The addition took 3 minutes and led to a marked decrease in viscosity. The reactants were allowed to react with each other for 30 min at this temperature. Precipitation from the solution was prevented by adding toluene until any precipitate disappears. The reaction taking place was:

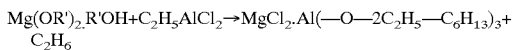
Mg(OR')$_2$.R'OH+C$_2$H$_5$AlCl$_2$→MgCl$_2$.Al(—O—2C$_2$H$_5$—C$_6$H$_{13}$)$_3$+ C$_2$H$_6$ (where R' is as defined above)

The Mg-complex produced was totally soluble in the toluene-pentane solvent mixture.

The solvents were evaporated at 120° C. under a stream of nitrogen resulting in a white powder. The composition of the complex is listed in Table 1 below.

TABLE 1

| Element | wt % | mol % | mol/mol Mg |
|---|---|---|---|
| Mg | 4.4 | 0.181 | 1 |
| Al | 5.3 | 0.196 | 1.1 |
| Cl | 13.9 | 0.392 | 2.2 |
| —O—2C$_2$H$_5$—C$_6$H1$_{13}$ | 61.8 | 0.475 | 2.7 |

X-Ray Diffraction

The X-ray diffraction pattern of the MgCl$_2$—Al(—O-2C$_2$H$_5$—C$_6$H$_{13}$)$_3$ complex is shown in FIG. 1 of the accompanying drawings. The pattern shows a peak typical for a larger organic group at 2Θ=6° which corresponds to the —O-2C$_2$H$_5$—C$_6$H$_{13}$ group that separates the metals. No sign of crystalline MgCl$_2$ can be detected in the X-ray spectrum.

EXAMPLE 3

Preparation of a Soluble Mgcl$_2$:Al (—O-2C$_2$H$_5$—C$_6$H$_{13}$)$_3$ Compound Into 14.67 kg (17.5 mol) of a solution containing 19.93% by weight BOMAG-A in toluene (supplied by Witco, having a magnesium content of 2.91% by weight) was added 4.567 kg (35.0 mol) 2-ethyl-1-hexanol (supplied by Neste Oxo) so that the molar ratio of alcohol to Mg was 2:1. The chemicals were allowed to react at about 30° C. for 2 hours. 13.22 kg (17.5 moles) of 16.8 wt. % solution of ethyl aluminum dichloride in pentane (EADC, supplied by Witco) was added so that the molar ratio of Al to Mg was 1:1. The chemicals were allowed to react at about 25° C. for 3 hours.

The resulting solution was analyzed and it was found to contain 1.24% by weight Mg and 3.7% by weight Cl.

EXAMPLE 4

Preparation of a Supported Catalyst 4.0 kg ES747JR silica, calcined at 590° C. for 5 hours, was loaded into a catalyst mixing tank. 10.4 kg of the solution prepared in Example 3 was added into a separate reaction vessel. 16.0 kg of toluene was further added into the separate reaction vessel. The temperature in the separate reaction vessel was adjusted to 25° C. Finally, 0.531 kg of TiCl$_4$ was added. The solution in the separate reaction vessel was added over 5 minutes to the silica in the mixing tank. The mixture was stirred for 5 hours at 25–30° C. temperature. The resulting solid catalyst was dried under nitrogen by heating the catalyst from 55° C. to 88° C. for 3 hours and keeping the catalyst at 88° C. for 18 hours.

The catalyst was analyzed and found to contain 2.4% by weight Ti, 2.1% by weight Mg, 13.2% by weight Cl and 2.4% by weight Al. The bulk density of the catalyst was 360 kg/m$^3$.

Ethylene was polymerized using the catalyst in a laboratory reactor and the activity was found to be 10.2 kg PE/g catalyst/h, the bulk density of the polymer was 370 kg/m$^3$, MFR$_2$ was 0.58 g/10 min and MFR$_{21}$ was 20 g/10 min.

EXAMPLE 5

Preparation of a Supported Catalyst

To 23.2 grams of the complex prepared according to Example 1 was added 23.34 ml of a 16.8% wt. solution of EADC in pentane. The chemicals were allowed to react and the resulting solution was collected.

A solution was made of 1.15 ml titanium tetrachloride and 18 ml toluene. To this solution was added the solution prepared above. The resulting solution was added to 15 grams of ES747JR silica, which had previously been calcined at 590° C. to remove the hydroxyl groups. The mixture was stirred for 3 hours while temperature increased from 20 to 44° C. The mixture was further stirred for 2.5 hours under nitrogen while the temperature was increased to 74° C. Then the catalyst was dried under nitrogen purge for 3 hours at 74° C. After this, it was further stirred for 7.5 hours while heating to 80° C.

Ethylene was polymerized using the catalyst in a laboratory reactor and the activity was found to be 12.8 kg PE/g catalyst/hr, the bulk density of the polymer was 320 kg/m$^3$ and MFR$_{21}$ was 17 g/10 min.

EXAMPLE 6

Unsupported Catalyst 0.08 ml titanium tetrachloride and 2.94 ml of the complex solution prepared according to Example 3 were mixed in a 15 ml glass flask.

0.8 ml of the solution was injected into a polymerization reactor together with 0.8 ml 10% triethylaluminum solution in toluene. The test polymerization with ethylene was otherwise conducted according to the procedure described above. After 35 minutes polymerization time, the reaction was terminated.

The amount of polymer in the reactor was 440 g MFR$_2$ was 0.41 g/10 min and MFR$_{21}$ was 8.8 g/10 min.

EXAMPLE 7

Preparation of a Soluble Magnesium:Aluminium Compound 13.8 kg of 19.9 wt-% BOMAG-A in toluene and 8.0 kg 20.1 wt-% BOMAG-A in toluene were mixed in a stirred reactor. Into 21.0 kg of the above BOMAG-A mixture was then added 6.57 kg of 2-ethyl-1-hexanol over 1.3 hours. At the start of the addition the temperature was 13° C., and it increased during the addition to 42° C. The mixture was allowed to react for 2 hours. The reactor was cooled down to 18° C. Then 19.0 kg of 16.8 wt-% EADC was added over 1.5 hours. The temperature was kept at 20° C. The resulting solution was stirred for another 2 hours.

EXAMPLE 8

Preparation of Supported Catalyst 5 kg ES747JR (calcinated at 590° C. for 5 hours) was loaded into a catalyst preparation vessel. An under pressure of −85 kPa was achieved by connecting a vacuum pump to the prepartion vessel. 10.1 kg of the solution prepared in Example 7 was added to the preparation vessel over 35 minutes. The temperature was 24–26° C. during the addition. The impregnated silica was stirred for 0.5 hours. 6.26 kg pentane was added to the preparation vessel. Finally, 0.664 kg titanium tetrachloride was added to the preparation vessel. The temperature was increased to 53° C., and the impregnated silica was mixed for 3 hours. The resulting catalyst was dried by purging with nitrogen at 85° C.

The resulting catalyst was analyzed and it was found to contain (by weight) 2.4% Ti, 1.9% Mg, 12.4% Cl and 1.9% Al.

The catalyst was test polymerized according to the procedure described above. The activity of the catalyst was found to be 6.2 kg PE/g cat/h, the MFR$_2$ was 0.39 g/10 min and MFR$_{21}$ was 13.5 g/10 min.

What is claimed is:

1. A process for the preparation of a Ziegler-Natta catalyst comprising the steps of:

(I) reacting a magnesium hydrocarbyloxy compound with a chlorine-containing aluminum or boron compound in a non-polar hydrocarbon solvent in which said magnesium hydrocarbyloxy compound is soluble whereby to produce a solution (A); and then either;

(II) (i) contacting the solution (A) with a chlorine containing tetravalent titanium compound to produce a solution (B);

(ii) impregnating solution (B) into a porous particulate support; or (III) (iii) impregnating solution (A) into a porous particulate support; and (iv) contacting the solid support with a chlorine containing tetravalent titanium compound; or (IV) (v) impregnating solution (A) into a porous particulate support pretreated with a chlorine containing tetravalent titanium compound.

2. A process as claimed in claim 1 wherein said magnesium hydrocarbyloxy compound is a compound of formula 1

$$MgR_x(OR)_yCl_z \quad (1)$$

where x and z are zero or positive numbers which may or may not be integers, each independently having values of less than 2, y is a positive number having a value of up to 2 and the sum of x, y and z is 2; and each R independently represents a $C_{1-20}$ hydrocarbyl group.

3. A process as claimed in claim 2 wherein said magnesium hydrocarbyloxy compound is the reaction product of an alcohol and a magnesium dihydrocarbyl compound.

4. A process as claimed in claim 3 wherein said magnesium dihydrocarbyl compound is a magnesium dialkyl.

5. A process as claimed in claim 4 wherein said magnesium dialkyl compound is butyl-octyl magnesium.

6. A process as claimed in claim 3 wherein said alcohol is 2-ethyl-hexanol or 2-methyl-pentanol.

7. A process as claimed in claim 1 wherein said chlorine-containing compound is an aluminum alkyl compound.

8. A process as claimed in claim 7 wherein said aluminium alkyl compound is ethyl aluminum dichloride.

9. A process as claimed in claim 1 wherein said chlorine-containing tetravalent titanium compound is titanium tetrachloride.

10. A process as claimed in claim 1 wherein said support is silica.

11. A process for the polymerisation of olefins comprising contacting at least one olefin with a catalyst prepared by a process as described in claim 1.

* * * * *